April 10, 1934.        A. H. OLSSON        1,954,535
DEVICE FOR PRODUCING UNDERCUT SAW TEETH OR THE LIKE
Filed March 10, 1933        2 Sheets-Sheet 1

Inventor:
Anders Hilmer Olsson
By [signature]
Attorney.

April 10, 1934.  A. H. OLSSON  1,954,535
DEVICE FOR PRODUCING UNDERCUT SAW TEETH OR THE LIKE
Filed March 10, 1933  2 Sheets-Sheet 2

Inventor:
Anders Hilmer Olsson
By [signature]
Attorney.

Patented Apr. 10, 1934

1,954,535

UNITED STATES PATENT OFFICE 1,954,535

DEVICE FOR PRODUCING UNDERCUT SAW TEETH OR THE LIKE

Anders Hilmer Olsson, Lidkoping, Sweden

Application March 10, 1933, Serial No. 660,313
In Sweden December 30, 1931

2 Claims. (Cl. 76—45)

This invention relates to a device for making undercut saw teeth, comprising a rotatable roll having cutting teeth for cutting the spaces between the saw teeth in the blade blanks adapted to be placed side by side on a base.

In accordance with the present invention, the object and advantages of which will be more particularly made clear below, a number of cutting beams are mounted after each other on the roll in the direction of rotation of the latter. The cutting teeth are made in the shape of threads on the said cutting beams in such a way, that each cutting tooth on a cutting beam forms part of a thread around the roll, such thread having a pitch equal to the product of the saw teeth pitch and the number of cutting beams, and is situated opposite to a cutting tooth, forming part of another thread, on each of the other cutting beams. Furthermore the cutting beams are mounted on the roll with somewhat different mutual center angles, or in other words the beams are spaced apart different circumferential distances, so that each group of opposite cutting teeth forming parts of different threads, of the cutting beams together cut a broader space between the saw teeth than represented by the width of each single cutting tooth.

An embodiment of the invention is illustrated in the accompanying drawings, in which Fig. 1 shows a side view of the device having a rotatable roll with the cutting teeth and having a working table for the blade blanks.

The blade blanks 1 are adapted to be placed on their edges side by side on a working table 2 where they are secured by means of clamping devices 3.

Figure 2:
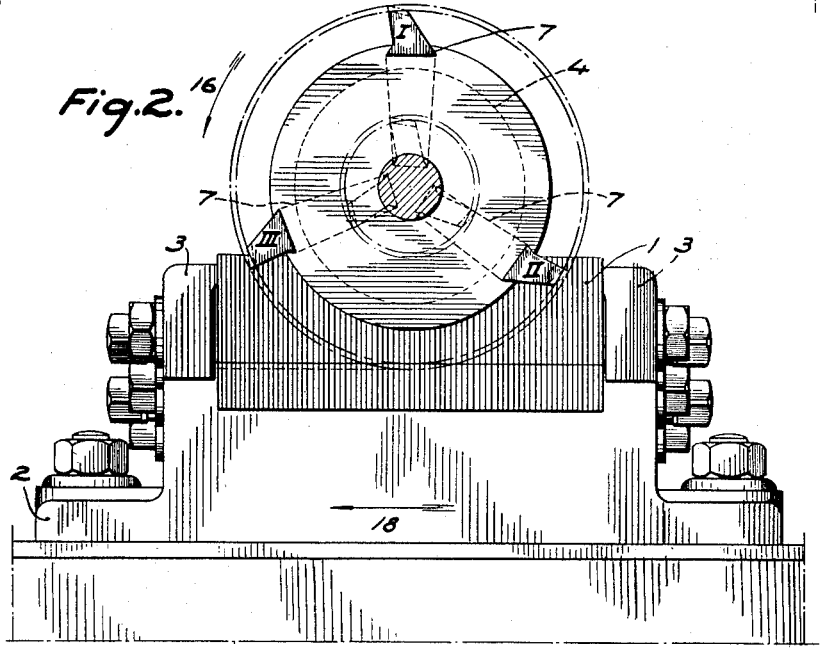
Fig. 2 shows the device viewed from one end of the roll.

According to the embodiment shown the roll provided with the cutting teeth is shaped as a conical drum 4 extending in the longitudinal direction of the blade blanks 1. As illustrated in the drawings the drum 4 is connected with pivots 6 by means of end plates 5, by which pivots the drum, driven in a suitable way in the direction of the arrow 16 (Fig. 2), is supported in bearings (not shown in the drawings).

Figure 1:
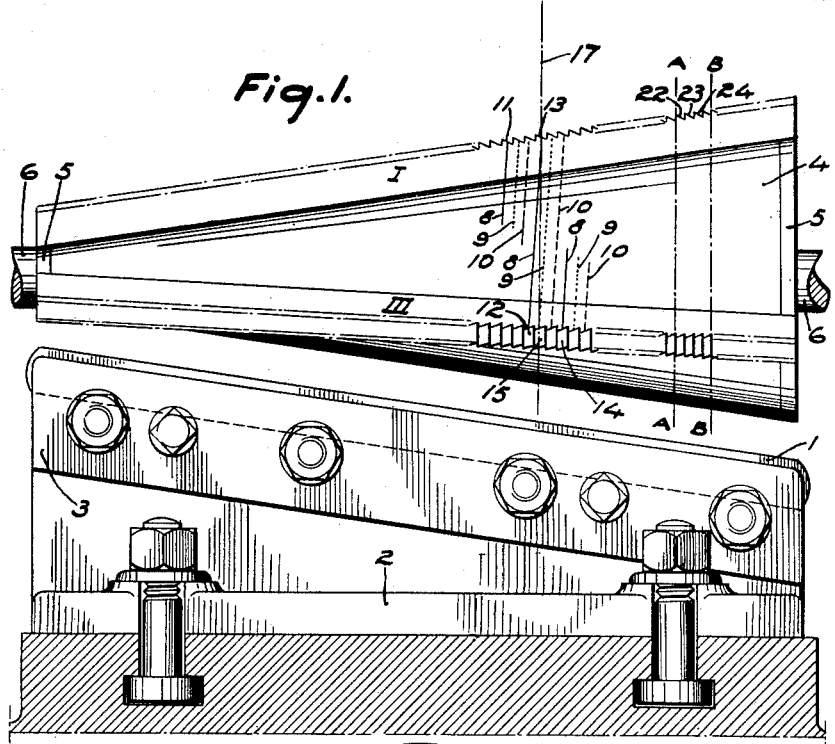

On the conical drum 4 a number of cutting beams I, II, and III are mounted after each other on the roll in the direction of rotation of the latter. The three preferably detachable cutting beams I, II, and III may be inserted in dovetailed grooves 7 in the outside of the drum 4. The cutting teeth of the cutting beams are made in the shape of threads, so that each cutting tooth of a cutting beam forms part of a thread around the roll, the thread having a pitch equal to the product of the saw teeth pitch and the number of cutting beams. Thus, the thread pitch is equal to the width of three cutting teeth in the illustrated embodiment. The imagined threads correspond in number to the cutting beams. In the present case, the threads amount to three and are illustrated in Fig. 1 by the lines 8, 9, and 10. The thread 8 is indicated by a full line, the thread 9 by a dotted line, and the thread 10 by a dashed line. The cutting tooth 11 of the cutting beam I, the tooth 12 of the cutting beam III, the tooth 13 of the cutting beam I, the tooth 14 of the cutting beam III and so on (see Fig. 1) form parts of the imagined thread 8 which, for each turn, advances a distance corresponding to the width of three teeth.

Each cutting tooth of a cutting beam is situated opposite to a cutting tooth, forming part of another thread, on each of the other cutting beams. Thus, the cutting tooth 13 forming part of the thread 8, on the cutting beam I is situated opposite to the cutting tooth 15 forming part of the thread 9, on the cutting beam III, and also opposite to a cutting tooth (not shown) of the cutting beam II, said tooth forming part of the thread 10, i. e. the said three teeth of the cutting beams I, III, and II work, when cutting, in one and the same space between the teeth of the blade blanks. The line 17 perpendicular to the axis of the drum 4 indicates that the teeth 13 and 15 are situated opposite to each other.

At the rotation of the drum 4 in the direction of the arrow 16 the working table 2, the inclination of which relatively to the axis of the drum is chosen according to the desired undercut-angle of the saw teeth, is fed in the direction of the arrow 18 (Fig. 2), the space between the saw teeth being cut from the blade blanks by means of the cutting teeth of the beams.

In order to make saw teeth with sharp edges the cutting beams I, II, and III are located on the roll with somewhat different mutual center angles, so that each group of opposite cutting teeth forming parts of different threads, on the cutting beams together cut a broader space between the saw teeth than represented by the width of each single cutting tooth. Due to the fact, that for example the center angle between the cutting beams I and III (the angle defined by lines drawn from beam I to the center of shaft 6 to beam III) is less than 120°, the cutting teeth 13 and 15 (Fig. 1) forming parts of the threads 8 and 9, will together cut a broader space than if the center angle had been 120°.

Figure 3:
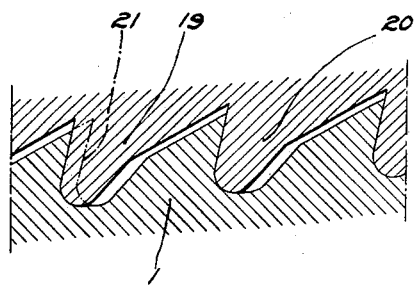
Fig. 3 shows how the saw teeth are cut by the device according to the invention.

According to Fig. 3 the space between the teeth of the saw blade 1 has become broader than the width of the cutting teeth 19, 20 due to the fact that through the mentioned location of the cutting beams on the roll said cutting teeth have become somewhat displaced axially relatively to the opposite cutting teeth of the other cutting beams. The line 21 indicates a previous position of a cutting tooth, situated on another cutting beam and located opposite to the cutting tooth 19.

The device according to the invention is very practical from a point of manufacture because no special subsequent adjustment of the cutting beams is necessary due to the fact that the threads may be cut after the cutting beams have definitely been secured on the roll with mutually different center angles.

Figure 4:
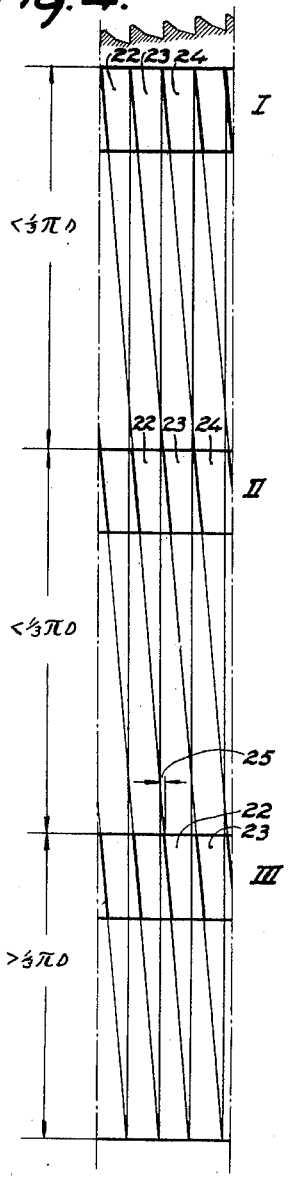
Fig. 4 shows diagrammatically a part of the circumference of the roll developed in a plane, in order to illustrate the mutual position of the cutting teeth.

In Fig. 4 showing a piece AA—BB (Fig. 1) of the circumference of the roll developed in plane, the threads are marked together with special lines perpendicular to the axis of rotation, the cutting teeth lying on the same thread having the same reference numbers for the sake of clearness. As will be clear, the cutting tooth 24 of the cutting beam I, the cutting tooth 23 of the cutting beam II, and the cutting tooth 22 of the cutting beam III are situated opposite to each other. At 25 the amount of the axial displacement caused by the different center angles of the cutting beams between the cutting member 24 of the cutting beam I and the cutting member 22 of the cutting beam III is shown.

As to the construction the device may of course be carried out in a great many different ways and the illustrated embodiment is only an example of the application of the invention.

Having now described my invention, what I claim as new and desire to secure by Letters Patent is:

1. A device for making saw teeth, comprising a rotatable roll, a plurality of circumferentially spaced cutting beams mounted on the surface of the roll and extending axially thereof, said cutting beams being unequally circumferentially spaced apart, each of said cutting beams having a plurality of cutting teeth formed thereon, said cutting teeth forming portions of threads extending around said roll, said threads corresponding in number to the number of cutting beams, said threads having a pitch equal to the product of the pitch of the saw teeth to be cut and the number of cutting beams, said teeth being so formed that a plane perpendicular to the axis of the roll and passing through the center of a tooth in one beam will pass substantially through the centers of teeth in the other beams, the teeth through which said plane passes constituting parts of different threads, the cutting teeth of each cutting beam being slightly out of alignment with the corresponding teeth of the other cutting beams so that the corresponding teeth of all of the cutting beams will cooperate to cut a space between the saw teeth wider than could be effected by a single cutting tooth.

2. A device for making saw teeth, comprising a rotatable frusto-conical roll, a plurality of circumferentially spaced cutting beams mounted on the surface of the roll and extending axially thereof, said cutting beams being unequally circumferentially spaced apart, each of said cutting beams having a plurality of cutting teeth formed thereon, said cutting teeth forming portions of threads extending around said roll, said threads corresponding in number to the number of cutting beams, said threads having a pitch equal to the product of the pitch of the saw teeth to be cut and the number of cutting beams, said teeth being so formed that a plane perpendicular to the axis of the roll and passing through the center of a tooth in one beam will pass substantially through the centers of teeth in the other beams, the teeth through which said plane passes constituting parts of different threads, the cutting teeth of each cutting beam being slightly out of alignment with the corresponding teeth of the other cutting beams so that the corresponding teeth of all of the cutting beams will cooperate to cut a space between the saw teeth wider than could be effected by a single cutting tooth.

ANDERS HILMER OLSSON.